May 20, 1958
C. D. DIPNER
2,834,993
METHOD OF FUSING HIGH MOLECULAR WEIGHT POLYMERS
AT LOW TEMPERATURES
Filed Sept. 28, 1953
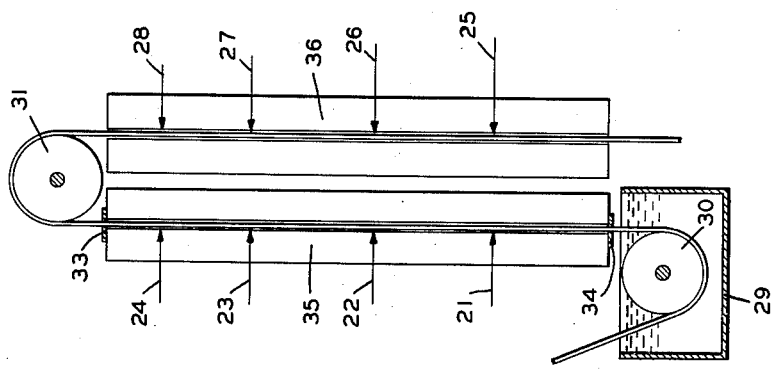
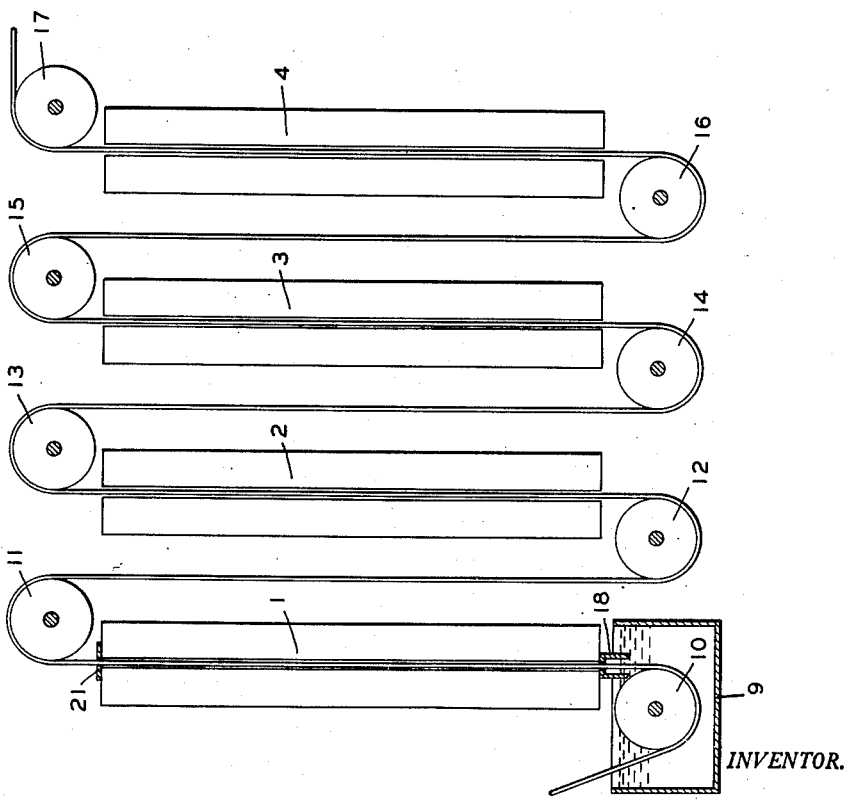
INVENTOR.
CHARLES D. DIPNER
BY
ATTORNEYS

United States Patent Office 2,834,993
Patented May 20, 1958

2,834,993

METHOD OF FUSING HIGH MOLECULAR WEIGHT POLYMERS AT LOW TEMPERATURES

Charles D. Dipner, Cranford, N. J., assignor, by mesne assignments, to Minnesota Mining and Manufacturing Company, St. Paul, Minn., a corporation of Delaware Application September 18, 1953, Serial No. 380,981

9 Claims. (Cl. 18—57)

This invention relates to the preparation of films of high molecular weight polymeric materials. More particularly, this invention relates to the preparation of supported and unsupported plastic films of improved quality, with a minimum of polymer degradation. In one aspect, this invention relates to the preparation of films from polymers of chlorofluoroethylenic compounds, and in particular, from chlorotrifluoroethylene polymers.

Polymers of chlorofluoroethylenic compounds, and particularly chlorotrifluoroethylene polymers, possess certain physical and chemical characteristics which make them desirable as surface coatings. The normally solid polymer produced from the single monomer chlorotrifluoroethylene is hard but not brittle and is flowable under pressure at temperatures above 225° C. The polymers of trifluorochloroethylene in general possess excellent mechanical properties, resistance to chemicals and oxidation, flame resistance, superior electrical properties and high working temperatures. Four fifths of the weight of the polymer of the single monomer is made of the two halogens, fluorine and chlorine. The quick quenched normally solid polymer is colorless and transparent. The polymer has a high chemical stability, no effect being observed on the polymer after prolonged exposure to concentrated sulfuric acid, hydrofluoric acid, hydrochloric acid, strong caustic, fuming nitric acid, aqua regia, and other vigorous oxidizing materials. The normally solid polymer is flexible and resilient, has a high impact strength at low temperatures and is resistant to thermal shock. The polymer is not wetted by water and is unaffected by high humidity. Table I below shows some of the electrical characteristics of the normally solid polymer under high frequency:

TABLE I

*Solid polymer of chlorotrifluoroethylene*

| Electrical Frequency, Cycles/sec. | Dielectric Constant E | Dielectric Power Loss Tan |
|---|---|---|
| $1 \times 10^2$ | 2.72 | $0.022 \pm 0.0011$ |
| $1 \times 10^3$ | 2.63 | $0.27 \pm 0.0014$ |
| $1 \times 10^4$ | 2.53 | $0.023 \pm 0.0012$ |
| $1 \times 10^5$ | 2.46 | $0.0135 \pm 0.0008$ |
| $1 \times 10^6$ | 2.43 | $0.0082 \pm 0.0004$ |
| $1 \times 10^7$ | 2.35 | $0.0060 \pm 0.0003$ |
| $1 \times 10^8$ | 2.30 | $0.0028 \pm 0.0002$ |
| $3 \times 10^8$ | 2.30 | 0.0030 |
| $3 \times 10^9$ | 2.30 | $0.0028 \pm 0.0002$ |
| $1 \times 10^{10}$ | 2.29 | $0.0039 \pm 0.0002$ |
| $2.5 \times 10^{10}$ | 2.29 | 0.0055 |

Other physical properties of the normally solid polymer are shown below in Table II:

TABLE II

| Property | Test Result |
|---|---|
| Specific gravity | 2.1 |
| Tensile strength at 77° F., p. s. i. | 4,600–5,700. |
| Thermal coefficient of linear expansion, in/in/° C | |
|   −80° C. to 20° C | $4.5 \times 10^{-5}$. |
|   20° C. to 150° C | $7 \times 10^{-5}$. |
| Water absorption, percent | 0.00. |
| Outdoor weathering, one year | No detectable change. |
| Rockwell hardness, R scale | 111–115. |

Normally solid polymers produced from the single monomer chlorotrifluoroethylene may be prepared by polymerizing the monomer in the presence of a suitable organic peroxide such as districhloroacetyl peroxide, as the polymerizing agent, at a temperature between about −20° and about 25° C., preferably at a temperature of about −16° C. At a temperature of −16° C. the polymerization of chlorotrifluoroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary. A discussion of the method of preparing the high molecular weight polymer of chlorotrifluoroethylene may be found in the patent to William T. Miller, Patent No. 2,579,437, issued December 18, 1951.

To distinguish the normally solid polymer over the oils and waxes produced with the same monomer, the polymer is described by reference to its no strength temperature. A no strength temperature (N. S. T.) of between about 200° and about 350° C. is characteristic of a normally solid polymer of the above preparation having plastic characteristics. Best plastic characteristics of the normally solid polymer are observed at N. S. T. values between about 240 and about 340. The N. S. T. values of the polymer depend upon such factors as temperature, residence time, concentration of promoter, pressure, etc. Since this invention does not relate to the method of producing the polymer of particular characteristics, further discussion thereof will not be undertaken.

The no strength temperature (N. S. T.) is determined in the following manner: A sample of polychlorotrifluoroethylene is hot pressed into a $\frac{1}{16}''$ thick sheet and cut into a strip of $\frac{1}{8}'' \times \frac{1}{16}'' \times 1\frac{5}{8}''$. The strip is notched $\frac{5}{8}''$ from the top so that the dimension at the notch shall be $\frac{1}{16}'' \times \frac{3}{64}''$. A fine wire and a standard weight is attached to one end of the strip. The weight of the polymer plus the wire and standard weight shall equal $\frac{1}{2}$ grams. The strip is then attached in a furnace and fixed vertically therein. The temperature of the sample is increased at a rate of about $1\frac{1}{2}°$ C. per minute in the furnace as the breaking temperature is approached. The no strength temperature is the breaking temperature of the sample. Differences of about 2° C. are considered significant.

The N. S. T. values for dispersed polymers and for polymer films are determined indirectly by comparing the Kinematic viscosity of solutions of these polymers with those of similar solutions of polymer samples of known N. S. T. values. From polymer dispersions, the particles are prepared for solution by filtration, followed by washing in acetone and drying. The polymer from films may be directly dissolved. The polymer is dissolved in 1,1,3-trifluoropentachloropropane to make up a solution of 0.5 weight percent. The Kinematic viscosity of this solution is measured at 210° F. and checked against a calibration curve prepared by measuring and plotting the kinematic viscosity of solutions of polymers of known N. S. T. values under similar conditions. For the sake of clarity, N. S. T. values determined in this manner will be called "interpreted" N. S. T. values.

As a result of the excellent chemical and physical properties of the polymers of chlorotrifluoroethylene and other chlorofluoroethylenic compounds, the polymers have use as coatings on various surfaces in order to make such surfaces corrosion resistant to chemicals. The good electrical, non-wetting and flame resistant properties of the polymers also make their use feasible as insulating coatings on electrical conductors, condensers, and various parts using electrical apparatus and circuits. The polymers may be applied to various surfaces, including flat and curved surfaces, wires, fabrics, yarn, paper, leather, cables, cans, glass, wood etc. The polymers may be applied to metal wires, to act as an insulator on the surface of the wires. The coating of fabrics with polychlorotrifluoroethylene plastic renders them fireproof and shrink resistant and increases their strength.

Initially, the normally solid polymers were applied to surfaces by melting the polymer and applying it, as by extrusion. In later develpoments solid polymers were applied in solutions or in suspensions to a surface, the solvent or dispersing medium evaporated and the residual polymer particles fused or sintered to form a coating. In the copending application of Herbert J. Passino and John M. Wrightson, Serial No. 135,614, filed December 29, 1949, a method is disclosed for producing films and coatings from solutions of chlorotrifluoroethylene polymers in perhalocarbon solvents. The solutions may be applied to a surface, as by dipping, painting or spraying, the solvent is evaporated and then the residual polymer particles are fused or sintered.

Application Serial No. 135,847, filed by Wilber O. Teeters on December 29, 1949, now Patent No. 2,686,738, issued August 17, 1954, on "Dispersion of Trifluorochlorocarbon Polymers" discusses the preparation of dispersions of the polymer of trifluorochloroethylene in nonaqueous dispersing liquids, such as ketones and esters. Application Serial No. 135,823 filed by Charles D. Dipner on December 29, 1949, now Patent No. 2,686,770, issued August 17, 1954, on "Dispersion of Fluorocarbon Polymers" discusses the preparation of dispersions of the same polymer in glycol dispersing media. Application Serial No. 202,408 filed by Wilber O. Teeters and Charles D. Dipner on December 22, 1950, now abandoned, on "Aqueous Dispersion of Fluorocarbon Polymers" discusses the preparation of dispersions of the polymer of trifluorochlorethylene in a liquid dispersing medium comprising water and a water soluble oxy-compound. Application Serial No. 282,306, filed by Irving Green and Charles D. Dipner on April 15, 1952 discloses a method whereby the above-mentioned dispersions may be prepared with a minimum degradation of the polymer in the dispersed particles. Dispersions prepared in the manner disclosed in the Green and Dipner application are particularly advantageous in the preparation of films according to the method of the present invention.

According to the methods disclosed in the above-mentioned dispersion applications, films could be prepared by the application of the dispersion to a surface, the evaporation of the dipersing medium and the fusion or sintering of the deposited solid particles. The temperatures disclosed for fusion or sintering range upward from 220° C., and the fusion or sintering period ranges from about 30 seconds to about 25 minutes, with shorter periods of time being associated with higher temperatures of fusion.

An unsupported film could be made by stripping a supported film off a high polymer supporting surface, and preferably one which has been coated with a mold-release compound, such as a silicone resin. An unsupported film could also be prepared, in the prior art, by extrusion of the polymer in the form of a flat sheet, or in the form of an endless tube, at temperatures above the fusion temperature.

These prior art methods of producing supported and nusupported films had inherent disadvantages which are overcome by the present invention. Films of certain desirable characteristics could be prepared only with great difficulty and by methods completely impractical from an economical point of view. Other films, made possible by the present invention, could not be prepared by prior art methods at all.

When plastic polymer particles are raised to fusion temperatures, or to elevated sintering temperatures, a degradation of the molecular weight of the molecules takes place and a film of inferior physical characteristics is produced.

Films produced by extrusion are particularly susceptible to degradation because of the high temperatures involved. Furthermore, it is extremely difficult to extrude plastic containing a high loading (15–20%) of pigment or filler.

It is, therefore, an object of this invention to provide a method for the preparation of films of high molecular weight polymer material.

Another object of this invention is to provide a method for the preparation of films, in which the polymer has increased thermal stability.

Another object of this invention is to provide a method of coating materials which are not resistant to excessive temperatures.

Another object of this invention is to provide a method for the preparation of plastic insulation for magnet and hook-up wire.

Another object of this invention is to provide a method for the preparation of plastic coatings for individual objects.

Another object of this invention is to provide a single stage method for the preparation of film coatings having a thickness of 5 mils., or more.

Another object to this invention is to provide a method for the preparation of free-stripping film.

Another object of this invention is to provide a method for the preparation of plasticized film.

Still another object of this invention is to produce supported and unsupported films of superior physical properties, and practicularly films of higher N. S. T. values, greater flexibility and lesser permeability.

The above objects are accomplished according to this invention by bringing the plastic at least partially into solution, at an elevated temperature below fusion temperature in a relatively non-volatile liquid component having solvent properties for the plastic at the elevated temperature and then evaporating off the liquid. It has been found that a continuous, fused plastic film can be deposited at temperatures below the fusion point of the plastic, by incorporating in the dispersion a high boiling aromatic component and/or a high boiling chlorofluorocarbon component, in which the plastic is at least partially soluble. The dispersion coating deposited on a surface, is heated to a temperature at which the plastic passes into solution and then the solvent component is evaporated. It is essential that the deposited dispersion coating should be heated in such a manner that the solvent is retained in the dispersion coating until the solution of plastic is accomplished.

The polymeric materials which can be fused by the practice of this invention include the homopolymers and copolymers of chlorofluoroethylenic compounds. Found among the chlorofluoroethylenic monomers from which the polymeric materials are derived are unsymmetrical dichlorodifluoroethylene, chlorotrifluoroethylene, 1,1-chlorofluoroethylene, trichlorofluoroethylene, 1,1-dichlorofluoroethylene, chloro-1,2-difluoroethyiene, chloro-1,1-difluoroethylene, 1-chloro-2-fluoroethylene, 1,2-dichloro-1-fluoroethylene. These monomers may be copolymerized with each other or may be copolymerized with other comonomers including vinyl halides, e. g. vinyl fluoride, vinyl chloride; vinylidene halides, e. g. vinylidene fluoride; esters, e. g. n-butyl-acrylate; and fluoroethylenes, e. g. trifluoroethylene and tetrafluoroethylene.

The preferred solvents which are suitable for the operation of the herein described invention with chlorotrifluoroethylene polymers are:

(1) High boiling, aromatic hydrocarbon substances having the following properties in common:

Boiling point—all of the material boils between 100° C. and 300° C. with a major portion boiling above about 160° C. and preferably above about 170° C. at atmospheric pressure.
Specific gravity—above about 0.80.
Evaporation rate—below about 35 percent by weight lost during 120 hours at room temperature.

(2) High boiling chlorofluorocarbon solvents such as the various commercial chlorotrifluoroethylene oils, greases and waxes, having a boiling range such that the bulk of the material boils above about 110° C. at 1 mm. of mercury absolute pressure.

The high boiling aromatic hydrocarbon substances include alkylated aromatic hydrocarbons and are normally mixtures of alkylated aromatic hydrocarbons such as might be obtained from coal tar fractions or from the cracking and hydroforming of petroleum fractions. A list of commercially available aromatic hydrocarbon solvents and their properties is shown in Table III:

pounds and the chlorofluorocarbon solvents are preferred, but other high boiling liquids of lesser high temperature solvent power may be used. For copolymers of chlorotrifluoroethylene containing substantial proportions of another halo-olefin, oxygenated organic compounds, such as high boiling ketones, esters and aromatic ethers are preferred. When liquids of low solvent power are used, it is preferred that they be used in admixture with liquids of higher solvent power or that their use be restricted to dispersions of low solids content.

Any of the preferred solvents may be used as the sole component of the dispersing medium, may be used in combination with other solvents or may be used in combination with an inert, substantially non-solvent diluent. When the solvent has a highly viscous or greasy consistency, other liquid components should be added to facilitate dispersion.

The minimum preferable amount of solvent used is dependent on the nature of the solvent and on the nature of the polymeric material used. With chlorotrifluoroethylene polymers and with aromatic or chlorofluorocarbon solvents, the solvent generally constitutes from about 25 to about 75 percent of the dispersion, where a liquid of low solvent power is used it may constitute as much as 90% or 95% of the dispersion.

The dispersions of polymeric material may be prepared by conventional methods usually consisting of finely dividing the material and then grinding or agitating the material with the dispersing medium. In accordance with the

TABLE III

Properties of chlorotrifluoroethylene polymers dispersion thinners

| | Color | ASTM IBP, °F. | Dist. EP, °F. | Flash Point, °F. | Sp. Gr. | Olefins and Aromatics, Vol. Percent Absorb.[a] | Br. No., Factor=0.3, Ml. titre per Ml. | Existent gum [b], Mg./100 Ml. | Evaporation rate [c] |
|---|---|---|---|---|---|---|---|---|---|
| Standard Thinner [d] | Water White | 268 | 340 | 85 | .8565 | 86.3 | 0.15 | 17.4 | 56.5 |
| Solvesso 150 | do | 356 | 435 | 155 | .8927 | 93.0 | 0.90 | 23.2 | 8.0 |
| Solvesso 100 | do | 318 | 369 | 120 | .8681 | 94.5 | 0.20 | 0.4 | 32.5 |
| Solvent D-5 | do | 332 | 390 | 135 | .855 | 71.0 | 0.60 | 1.6 | 20.5 |
| Solvent D-59 | do | 283 | 409 | 100 | .8762 | 96.5 | | | |
| Hi-Flash (Barrett) | do | 310 | 345 | 115 | .8681 | 92.8 | 0.10 | 0.0 | 30.0 |
| Amsco Solv. F-80 | Slightly straw | 306 | 396 | 115 | .8618 | 78.0 | 0.70 | 3.0 | 23.8 |

[a] ASTM D1019-51.
[b] ASTM D381-50.
[c] Evap. rate—Wt. percent evaporated at 120 hrs. at room temp.
[d] Standard thinner—81.9% xylene, 18.1% di-isobutylketone.

The high boiling chlorofluorocarbon solvents suitable for the operation of this invention include aliphatic and aromatic compounds, the latter class being either with or without side chains. The aliphatic compounds and the side chains of the aromatic compounds should preferably be substantially fully substituted by chlorine and fluorine. The chlorofluorocarbon solvents also include lower liquid polymers of chlorotrifluoroethylene and other chlorofluoroethylenic compounds. Typical of such polymers are the chlorotrifluoroethylene polymeric oils such as those available commercially under the brand name "Kel-F." These are available in various grades suitable for the operation of this invention, having properties as tabulated below:

| Grade | Type | Boiling Range at 1 mm., Vapor Temp. °F. | Pour Point, °F., Approximate | Melting Point, Approximate |
|---|---|---|---|---|
| #3 | Medium Oil | 230–284 | Below −35 | |
| #10 | Heavy Oil | 284–392 | −20 | |
| #40 | Grease | 392–446 | +85 | +87 |
| #150 | Wax | 446 and up | +135 | +127 |

For the homopolymer of chlorotrifluoroethylene and for similar polymers, the aromatic hydrocarbon comdisclosure of application Serial No. 282,306, mentioned above, polymer degradation may be held at a minimum by dry milling the polymer to desired fineness, and then wet milling it in a dispersing medium for a period of from three to ten hours. Since one of the objects of this invention is to produce films of high N. S. T. values, it is advantageous to use the dispersing method described in application Serial No. 282,306 since the N. S. T. value of the film can be no higher than that of the dispersed polymer particles from which it is made.

If desired, plasticizers, such as polymeric chlorotrifluoroethylene oils, may also be incorporated in the dispersion to the extent of about 1 percent to about 75 percent by weight, and preferably between about 5 percent and about 25 percent by weight. Generally, the presence of a plasticizer lowers the fusion temperature of a dispersion residue and produces a more resilient film. The polymeric chlorotrifluoroethylene oils act not only as plasticizers, but also as solvents and appreciable amounts of the oils will be removed from the plastic by volatilization. The amount and boiling range of the oil used for combined plasticizer and solvent effect is determined by the amount desired in the end product, as plasticizer, and the conditions of volatilization. If no plasticizer is desired in the coating, as little oil should be used as possible while still retaining the advantage of the solvent effect during fusion. Generally, little, if any, plasticizer is required in the finished films since the unplasticized films have sufficient resiliency for most uses and have enhanced corrosion resistance and electrical properties.

If the plastic is to be colored or filled, an amount of inorganic material representing 0.1% to 10% or more, by weight of the dispersion may be added. Any pigment which does not contain copper may be used, provided its particle size is the same or smaller than the particle size of the plastic and provided it is color-fast (or stable) at the temperatures involved in fusing the plastic.

It is known that at elevated temperatures, and particularly at prolonged maintenance of elevated temperatures, copper degrades chlorofluoroethylenic polymeric materials. Films of such materials should preferably not be used in direct contact with raw copper metal if they are intended for prolonged exposure to temperatures of 150° F. or higher. It is preferable in such cases to silver plate, nickel plate or coat the copper by some other method prior to coating with the chlorofluoroethylenic polymer. Even shorter periods with higher temperatures, such as have been used in the fusion of coatings prior to this invention, may result in considerable degradation of chlorofluoroethylenic polymers. It is, therefore, advantageous to use the method of this invention in coating raw metal copper with a chlorofluoroethylenic polymer when it is not anticipated that the coating will be subjected to high temperatures after fabrication. Metals, such as aluminum, silver, nickel, etc., and non-metallic materials can be coated without appreciable degradation by the method of this invention.

It is often desirable to coat a wire with a nonadherent or free-stripping film. A film containing about 5% to 20% of inorganic filler is less adherent than a film without filler. The preferred method of coating a wire with a free-stripping film is to deposit a thin basecoat of filled plastic on the wire and then to apply an overcoat of clear plastic to supply the additional material necessary for adequate insulation.

The preferred dispersion formulations, where polymeric chlorotrifluoroethylene is the plastic, comprises a high N. S. T. plastic, polymeric chlorotrifluoroethylene oils and Solvesso 150. The Solvesso 150 comprises about 25 to 75 percent by weight of the dispersion. The polymeric chlorotrifluoroethylene oils preferably comprise about 5 percent to about 25 percent by weight of the dispersion. As stated above, the oils act as both plasticizers and as solvents. When the formulation is to be used for wire coating, it is generally not desired to retain plasticizer in the coating and as little oil as possible is used while still retaining the advantage of the solvent effect during fusion.

Copolymers of chlorotrifluoroethylene and vinylidene fluoride are easily fused in Solvesso 150 alone. The greater the mole percent of the vinylidene fluoride present, the greater the solubility of the copolymer. With copolymers it is possible to use lower fusion temperatures, and higher wire speeds when coating wire by the continuous methods discussed below.

It is preferable that during application of the dispersion, during the time intervening between the application and fusion, and during fusion itself that the dispersion be protected from evaporation of the solvent component. In preparing wire coating it has been found advantageous with some dispersion formulations to place a tube, through which the wire passes, between the dispersion tank and the furnace. It is preferred that objects, which have had the dispersion applied to them, should be protected from extensive exposure to the atmosphere. The necessity of retaining the solvent is also reflected in the method of fusion. The dispersion must reach the temperature at which the polymeric material passes into solution before the solvent is extensively depleted through evaporation.

The fusion of the plastic contained in a dispersion with a solvent component takes place at an oven temperature between about 100° C. and 300° C., dependent on the nature of the plastic, the nature and amount of solvent and the heating time. Preferably, for minimum degradation of the polymer, the oven temperature should be maintained below about 250° C. In any case, the temperature is below that at which fusion takes place in the absence of the solvent and below that at which substantial degradation of polymer takes place. Care must be taken to differentiate between the oven temperature, as recorded by a thermocouple in the fusion chamber and the actual fusion temperature of the plastic. Because of the rapidity of the solvent-fusion action and because of the endothermic nature of the solution process and of evaporation, even where it is minimized, the temperature of the plastic is lower than that of the oven. The temperature of the plastic is extremely difficult to determine. However, a measure of the degree of difference may be ascertained by comparing the oven temperature necessary for fusion in an oven wherein evaporation is minimized with the oven temperature necessary in an oven where evaporation is substantially eliminated. A particular dispersion, requiring an oven temperature of 250° C. for fusion in reduced air circulation is fused at 190° C. where air circulation is substantially eliminated.

It has been experimentally demonstrated that the plastic must be brought to its fusion temperature immediately upon its entrance into the fusion chamber to avoid the volatilizing of the solvent before the plastic undergoes the solution-fusion action. It has also been determined that the use of a fouled chamber, which will retain the vapors of the solvent is advisable. A completely fouled oven is one in which there is no circulating air. Once the plastic has been fused the remainder of the heat application is to remove the solvent mixture from the plastic. The drying operation need not be limited to the same temperature as the fusion process, but should be within the oven temperature range stated above and preferably at an oven temperature below about 250° C.

The formulations comprising polymeric chlorotrifluoroethylene oils and Solvesso 150 will fuse through a combination fusion and solvent action at a temperature between about 160° C. and about 250° C. Rapid fusion which does not involve the use of solvents, and a fouled oven does not take place until a temperature of about 300 to 340° C. has been reached. However, at 300–340° C. chlorotrifluoroethylene plastic degrades very rapidly.

Supported films, or coatings, are prepared according to the present invention by a modification of prior art methods so that solvent action is utilized. Individual objects may be coated by dipping or spraying them with a dispersion of the desired plastic, rapidly heating them to the temperature at which the plastic will go into solution and then evaporating the solvent to deposit a residual, continuous film. It is necessary to bring the plastic into solution before the solvent is lost. The preferred method of fusion is one wherein a fouled oven, in which the solvent vapors are retained, is employed until solution is accomplished and then a forced draft oven is employed for evaporating the solvent.

Unsupported film is prepared by applying the dispersion to a smooth, polished support, heating the support and dispersion sufficiently to bring the plastic into solution, somewhat drying the plastic, removing the soft film from the support before it has adhered firmly and then completely driving off the solvent by further heating.

Wire coatings produced in accordance with this invention are generally produced with conventional equipment comprising one or more fusion towers, and drying towers, a dip tank and a sufficient number of sheaves to transport the wire from tower to tower.

In addition to this apparatus, a tube may be inserted extending from below the liquid level in the dip tank to the bottom of the oven. The purpose of this tube is to completely stop the air flow around the wire. It is desirable to place a plate with an aperture at the exit of at least the first fusion tower so that the passage of wire may be permitted without substantial loss of solvent vapor. In some cases it is desirable to place plates with apertures at both the entrance and exit of the fusion tower. An illustration of a representative apparatus set-up is shown in Figure 1 of the accompanying drawings.

The system consists of four glass tubes, 1 inch in diameter and 48 inches high with a plate containing a 5/16 inch hole fastened to the top of the first tube. The tubes are mounted vertically side by side, each heated electrically by two variable wirings, not shown, one at the top and the other at the bottom. Thermocouples, not shown, are mounted in each tube, 6 inches and 42 inches from the base. A dip tank 9 is mounted at the base of the first tube. Normally, the wire from the pay-off spool, not shown, enters the dip tank, passes under the immersed coating sheave 10, through tube 18, extending below the liquid level in the dip tank, upward through the first oven tube 1, through the apertured cover plate 21, over the copper sheave 11, down the outside of the first oven tube, under the dry running sheave 12 at the base of the second oven tube 2, up through the tube and similarly through the third oven tube 3, the fourth oven tube 4 and sheaves 13, 14, 15, 16, and 17, and thence to the take-up spool, not shown.

Since a dip tank is provided at the base of the first tube only, multiple coatings are applied by rerunning the wire through the entire assembly as often as required. Dry passes are run by feeding the wire through all four tubes without going through the dip tank.

It is important that the wire be brought quickly to the fusion temperature of the plastic as soon as it enters the oven, that is, in about the first six inches of the tower.

The operable wire speeds are dependent upon the temperature of the oven, the length and number of fusion towers, the temperature gradient, the solvent used, the wire size and the nature of the plastic. It is possible to bring about fusion over a wide range of wire speeds, as, for example, from about 5 to about 60 feet per minute. For the fusion of plastic chlorotrifluoroethylene polymer from a dispersion containing chlorotrifluoroethylene oils and Solvesso 150, in an 8 foot tower the optimum wire speed seems to be about 25 feet per minute.

Figure 2 shows an apparatus similar in principle to that of Figure 1, but comprising two 8 foot towers in place of the four 4 foot towers. The wire from a pay-off spool, not shown, enters the dip tank 29, passes under the immersed coating sheave 30, through the apertured cover plate 34, upward through the first tube 35, through aperture cover plate 33, over the upper sheave 31, downward through the second tube 36 and thence to the take-up spool, not shown. Four thermocouples are mounted in each tube at levels 6 inches, 42 inches, 54 inches and 90 inches from the base. The positions of these thermocouples are designated in the drawing as 21, 22, 23 and 24 in the first tube, and 25, 26, 27 and 28 in the second tube in the apparatus of Figure 2. There is no tube between the oven and the dip tank.

EXAMPLE I

A dispersion was prepared comprising 33 parts by weight of chlorotrifluoroethylene plastic, having an N. S. T. of 311° C., 11 parts by weight of chlorotrifluoroethylene grease (Kel–F 40) and 56 parts by weight of Solvesso 150 thinner. It was used to coat a solid wire having a diameter of 0.025 inch, plated with 4% by weight of silver (equivalent to a coating of 0.0003 inch). In the two eight foot, one inch diameter vertical tubes used for these experiments, the natural draft, together with the draft created by the upward movement of the wire, is sufficient to exhaust the vapors and minimize solvent action. Plates with apertures of 5/16" diameter fastened to the top and bottom of the first tube do much to cut down the loss of solvent vapors and promote solvent action. The data shown below in Table IV shows that this dispersion, containing 25% of chlorotrifluoroethylene oil (plastic to oil ratio=75/25) fuses poorly, if at all, at oven temperatures of 300° C. when no cover plates are fastened to the first tube, whereas good fusion is possible at 250° C. if the cover plates are in position. These temperatures refer primarily to the bottom 6" zone of the first tube where actual fusion due to solvent action primarily takes place. Indeed, with the plates in position, temperatures elsewhere in the tubes can be reduced to 200° C. without preventing fusion, although the adhesion of the coating is poor compared to that obtained when all zones are maintained at 250° C. The results of these runs show clearly the effect of minimizing the volatilization.

TABLE IV

| Run No. | Dispersion, NST | Heat Pattern | | Cover Top | Plate Btm. | Wire Speed, ft./min. | Coats | Dry Passes | Insulation | | | | | Remarks |
|---|---|---|---|---|---|---|---|---|---|---|---|---|---|---|
| | | Thermo-couple No. | Temp., ° C. | | | | | | Film Thick, Mils | Wet Dielectric Test | | Dry Dielectric Test | | NST | |
| | | | | | | | | | | Volts/mil | Volts | Volts/mil | Volts | | |
| 29–G | 311 | 21 / 22–28 | 300 / 250 | Off | Off | 15 | 1 | | 0.5 | | | | | | Poor fusion. |
| 16–L | 311 | 21–28 | 250 | On | Off | 15 | 3 | 3 | 1.5 | 1,133 / 833 / 400 | 1,700 / 1,250 / 600 | 2,166 / 1,933 / 1,333 | 6,500 / 5,800 / 4,000 | 291 | 1 dry pass after each coat. |
| 24–F | 311 | 21–28 | 250 | On | Off | 15 | 2 | 4 | 1.3 | 1,615 / 1,307 / 770 | 2,100 / 1,700 / 1,000 | 2,692 / 1,923 / 1,923 | 7,000 / 5,000 / 5,000 | 283 | 2 dry passes after each coat. |
| 26–F | 311 | 21–28 | 250 | On | On | 15 | 2 | 4 | 0.8 | 1,500 / 1,500 / 1,375 | 1,200 / 1,200 / 1,100 | 2,812 / 2,812 / 2,750 | 4,500 / 4,500 / 4,400 | 277 | 2 dry passes after each coat. |
| 29–P | 311 | 21 / 22–28 | 250 / 200 | On | On | 15 | 3 | 6 | 1.45 | 2,070 / 550 / 415 | 3,000 / 800 / 600 | 2,760 / 2,760 / 2,414 | 8,000 / 8,000 / 7,000 | | 2 dry passes after each coat; poor adhesion; sleeves. |

EXAMPLE II

A dispersion similar to that used in Example I, and containing chlorotrifluoroethylene plastic having an N. S. T. value of 311° C., was prepared. It was used to coat the plated conductors of various types in the apparatus of Figure 2, with a cover plate having a 5/16" diameter hole fastened to the top of the fusion tube. The oven temperature was maintained at 250° C. throughout and a wire speed of fifteen feet per minute was used. In Table V data are summarized to show that comparable magnet wire insulations can be laid down on 2S aluminum, silver plated copper and nickel-clad copper, although wet dielectric breakdown voltages were consistently higher for aluminum wire and the adhesion of the coating to aluminum was especially good.

TABLE V

| Run No. | Conductor | Plating Thickness, mils | Coats | Dry Passes | Insulation | | | | | NST | Remarks |
|---|---|---|---|---|---|---|---|---|---|---|---|
| | | | | | Film Thickness, mils | Wet Dielectric Test | | Dry Dielectric Test | | | |
| | | | | | | Volts/mil | Volts | Volts/mil | Volts | | |
| 16-J | silver-plated copper. | 0.3 | 2 | 2 | 1.0 | 1,000<br>700<br>500 | 1,000<br>700<br>500 | 2,650<br>1,750 | 5,300<br>3,500 | | |
| 16-L | ---do--- | 0.3 | 3 | 3 | 1.5 | 1,133<br>833<br>400 | 1,700<br>1,250<br>600 | 2,166<br>1,933<br>1,333 | 6,500<br>5,800<br>4,000 | 291 | Continuation of 16-J. |
| 17-D | 100% 2S aluminum. | | 2 | 2 | 1.0 | 1,500<br>700<br>700 | 1,500<br>700<br>700 | 2,450<br>2,350<br>2,300 | 4,900<br>4,700<br>4,600 | | |
| 17-F | ---do--- | | 3 | 3 | 1.6 | 1,937<br>1,874<br>1,562 | 3,100<br>3,000<br>2,500 | 2,500<br>2,187<br>1,875 | 8,000<br>7,000<br>6,000 | 290 | Continuation of 17-D. |
| 17-J | Nickel-clad | 1.3 | 2 | 2 | 1.0 | 1,800<br>500<br>500 | 1,800<br>500<br>500 | 2,250<br>1,750 | 4,500<br>3,500 | | |
| 17-L | ---do--- | 1.3 | 3 | 3 | 1.6 | 1,062<br>750<br>562 | 1,700<br>1,200<br>900 | 2,250<br>2,187<br>1,250 | 7,200<br>7,000<br>4,400 | a 279 | Continuation of 17-J. | a NST of section of wire covered with 1.7 mil film which was blistered and apparently contained residual plasticizer.

EXAMPLE III

A dispersion was prepared comprising 33 parts by weight of chlorotrifluoroethylene plastic and 67 parts by weight of Solvesso 150 thinner. In an apparatus similar to that of Figure 2 the extent of fouling of the oven, which is necessary to accomplish fusion of this dispersion, was determined. No fusion was observed with plates having 5/16" diameter apertures fastened to the top and bottom of the fusion tube while maintaining the fusion tube and the drying tube at 250° C. and running the wire at speeds ranging from 10 feet per minute to 30 feet per minute. However, after attaching a glass tube to the bottom of the fusion tube and extending it to a point below the liquid level in the dip tank, the air flow was effectively cut down and the dispersion coating on the wire fused to a continuous film at oven temperatures as low as 190° C. to 200° C. and at wire speeds ranging from 15 feet per minute to 20 feet per minute. Under these conditions the fusion tube operated much like an reflux condenser.

EXAMPLE IV

This example is intended to illustrate my invention as applied to the coating on a flat surface rather than on wire. The same principle, that of retention of the solvent vapors until solution is accomplished, is employed. In order to check the applicability of this principle to surface coating and in order to determine conditions to be used with various dispersion formulations, an inverted beaker test was developed. It was found that by applying a wet coating of the dispersion comprised of chlorotrifluoroethylene plastic and Solvesso 150 to one side of a thin steel panel, 12" x 4" x 0.020", covering the center of the panel with an inverted 400 cc. beaker, approximately 4" in diameter, and placing the assembly in a forced draft oven, at 250° C., the wet coating under the beaker fused instantly to a transparent and tough continuous film. The beaker momentarily delays evaporation of the solvent until the solution temperature is reached. The wet coating outside the beaker dries to a white powder. The data tabulated below in Table VI show the results of the beaker test for several dispersion formulations:

TABLE VI

| No. | Dispersion Composition | Results |
|---|---|---|
| 1 | 33 parts chlorotrifluoroethylene plastic<br>55 parts xylene<br>12 parts di-isobutylketone | No fusion at 250° C. in 2 min. as shown by opaque, non-coherent coating. |
| 2 | 33 parts chlorotrifluoroethylene plastic<br>11 parts chlorotrifluoroethylene wax<br>46 parts xylene<br>10 parts di-isobutylketone | No fusion at 250° C. in 2 min. |
| 3 | 33 parts chlorotrifluoroethylene plastic<br>67 parts Solvesso 150 | Completely fused at 250° C. in 2 min. |
| 4 | 33 parts chlorotrifluoroethylene plastic<br>21.5 parts xylene<br>45.5 parts Solvesso 150 | Do. |
| 5 | 33 parts chlorotrifluoroethylene plastic<br>37 parts xylene<br>8 parts di-isobutylketone<br>22 parts Solvesso 150 | Partly fused at 250° C. in 2 min. |
| 6 | 33 parts chlorotrifluoroethylene plastic<br>11 parts chlorotrifluoroethylene grease<br>56 parts Solvesso 150 | Completely fused at 250° C. in 2 min. |
| 7 | 33 parts chlorotrifluoroethylene plastic<br>67 parts Hi-Flash (Barrett) | No fusion at 250° C., 230° C., 190° C. or 170° C. in 2 min. |
| 8 | 33 parts chlorotrifluoroethylene plastic<br>11 parts chlorotrifluoroethylene grease<br>56 parts Hi-Flash (Barrett) | Completely fused at 250° C., 230° C., 210° C. and 190° C. in 2 min. No fusion at 170° C. in 4 min. |
| 9 | 33 parts chlorotrifluoroethylene plastic<br>11 parts chlorotrifluoroethylene grease<br>56 parts Solvesso 100 | Completely fused at 250° C. in 2 min. |
| 10 | 33 parts chlorotrifluoroethylene plastic<br>11 parts chlorotrifluoroethylene grease<br>56 parts solvent D-5 | Do. |
| 11 | 33 parts chlorotrifluoroethylene plastic<br>11 parts chlorotrifluoroethylene grease<br>56 parts solvent D-59 | Do. |
| 12 | 33 parts chlorotrifluoroethylene plastic<br>11 parts chlorotrifluoroethylene grease<br>56 parts odorless 140 | Do. |

I claim:
1. A method of coating a wire with a high molecular weight polymer of chlorofluoroethylenic compound which comprises applying to said wire as a coating a suspension of said polymer in a liquid organic dispersing medium comprising an aromatic hydrocarbon liquid the bulk of which boils at atmospheric pressure above about 160° C. and having a rate of evaporation such that less than 35 percent by weight of the liquid is lost during 120 hours at room temperature, rapidly heating the suspension in a substantially non-circulating atmosphere in an atmosphere maintained at a temperature between about 100° C. and 300° C. under conditions conducive to the retention of the aromatic hydrocarbon in liquid phase, whereby said polymer undergoes a combined solution and fusion action, thereafter continuing the application of heat in a circulating atmosphere and under conditions conducive to the volatilization of the aromatic hydrocarbon and at a temperature below about 300° C. until the polymer coating is substantially dry.

2. A continuous method of coating a wire with a high molecular weight polymer of a chlorofluoroethylenic compound which comprises continuously passing said wire through a suspension of said polymer in an aromatic hydrocarbon liquid the bulk of which boils at atmospheric pressure above about 160° C. and having a rate of evaporation such that less than 35 percent by weight of the liquid is lost during 120 hours at room temperature, said wire being protected by a barrier from extensive atmospheric circulation, passing said wire into a solution and fusion zone maintained at a temperature between about 100° C. and 300° C. in a substantially non-circulating atmosphere, retaining the wire in said solution and fusion zone until the polymer undergoes a combined solution and fusion action and thereafter passing said wire to a volatilization zone maintained at a temperature within the aforesaid temperature range but allowing free atmospheric circulation whereby the bulk of the aromatic hydrocarbon liquid is volatilized.

3. The process of claim 2 wherein the high molecular weight polymer of a chlorofluoroethylenic compound comprises a polymer of chlorotrifluoroethylene.

4. The process of claim 3 wherein the suspension contains a polymeric chlorotrifluoroethylenic oil and the temperature in the solution and fusion zone is maintained between about 160° C. and about 250° C.

5. A method for forming a film of a high molecular weight polymer of a chlorofluoroethylenic compound which comprises preparing a suspension of said polymer in a liquid organic dispersing medium selected from at least one of the group consisting of an aromatic hydrocarbon liquid, the bulk of which boils at atmospheric pressure above 160° C. and having an evaporation rate such that less than 35 percent by weight of the liquid is lost during 120 hours at room temperature, and a high boiling chlorofluorocarbon having a boiling range such that the bulk of the material boils above 110° C. at 1 mm. of mercury absolute pressure, applying said suspension to a supporting surface, rapidly raising the temperature of said suspension in a substantially non-circulating atmosphere to dissolve at least a portion of the polymer in the dispersing medium, then volatilizing off the bulk of the dispersing medium in a circulating atmosphere at an elevated temperature and maintaining the surrounding temperature at all stages not higher than about 250° C.

6. The method of claim 5 wherein the high molecular weight polymer of the chlorofluoroethylenic compound is a polymer of chlorotrifluoroethylene.

7. A method for preparing a film from a suspension of a high molecular weight polymer material in a liquid organic dispersing medium selected from at least one of the group consisting of an aromatic hydrocarbon liquid, the bulk of which boils at atmospheric pressure above 160° C. and having an evaporation rate such that less than 35 percent by weight of the liquid is lost during 120 hours at room temperature, and a high boiling chlorofluorocarbon having a boiling range such that the bulk of the material boils above 110° C. at 1 mm. of mercury absolute pressure, which comprises applying said suspension to a supporting surface, rapidly raising the temperature of said suspension in a substantially non-circulating atmosphere to dissolve at least a portion of the polymeric material in the dispersing medium, then volatilizing off the bulk of the dispersing medium in a circulating atmosphere at an elevated temperature and maintaining the surrounding temperatures at all stages not higher than about 300° C.

8. A method for preparing an unsupported film of a high molecular weight of a chlorofluoroethylenic compound which comprises preparing a suspension of said polymer in a liquid organic dispersing medium selected from the group consisting of an aromatic hydrocarbon liquid, the bulk of which boils at atmospheric pressure above 160° C. and having an evaporation rate such that less than 35 percent by weight of the liquid is lost during 120 hours at room temperature, and a high boiling chlorofluorocarbon having a boiling range such that the bulk of the material boils above 110° C. at 1 mm. of mercury absolute pressure, applying said dispersion to a supporting surface, rapidly raising the temperature of said suspension in a substantially non-circulating atmosphere to dissolve at least a portion of the polymer in a dispersing medium, volatilizing off a portion of the dispersing medium in a circulating atmosphere at an elevated temperature, maintaining the surrounding temperatures at all stages not higher than 300° C., removing the resulting soft partially dried film from the support before it has adhered firmly and then substantially completely driving off the dispersing medium.

9. The method of claim 8 wherein the high molecular weight polymer of the chlorofluoroethylenic compound is a polymer of chlorotrifluoroethylene.

References Cited in the file of this patent

UNITED STATES PATENTS

| 2,078,526 | Calvert | Apr. 27, 1937 |
| 2,260,501 | Wynd | Oct. 28, 1941 |
| 2,302,332 | Leekley | Nov. 17, 1942 |
| 2,366,564 | Shaw | Jan. 2, 1945 |
| 2,510,078 | Compton | June 6, 1950 |
| 2,542,069 | Young | Feb. 20, 1951 |
| 2,542,071 | Sprung | Feb. 20, 1951 |
| 2,718,511 | Sprung et al. | Sept. 20, 1955 |